(12) United States Patent
Zeh et al.

(10) Patent No.: US 8,957,137 B2
(45) Date of Patent: Feb. 17, 2015

(54) ACID-RESISTANT, HYDRAULICALLY SETTING MASSES

(75) Inventors: Harald Zeh, Burghausen (DE); Jörgen Bezler, Burghausen (DE); Stefan Bonimeier, Garching (DE); Armin Hoffman, Neuötting (DE); Hermann Lutz, Emmerting (DE)

(73) Assignee: Wacker Chemie AG, Munich (DE)

( * ) Notice: Subject to any disclaimer, the term of this patent is extended or adjusted under 35 U.S.C. 154(b) by 437 days.

(21) Appl. No.: 13/141,289

(22) PCT Filed: Dec. 15, 2009

(86) PCT No.: PCT/EP2009/067163
§ 371 (c)(1),
(2), (4) Date: Jun. 21, 2011

(87) PCT Pub. No.: WO2010/072618
PCT Pub. Date: Jul. 1, 2010

(65) Prior Publication Data
US 2011/0257304 A1 Oct. 20, 2011

(30) Foreign Application Priority Data
Dec. 22, 2008 (DE) .......................... 10 2008 055 064

(51) Int. Cl.
| | | |
|---|---|---|
| C04B 24/26 | (2006.01) |
| C08K 3/00 | (2006.01) |
| C04B 28/08 | (2006.01) |
| C04B 14/14 | (2006.01) |
| C04B 24/42 | (2006.01) |
| C04B 24/08 | (2006.01) |
| C04B 103/00 | (2006.01) |
| C04B 111/23 | (2006.01) |

(52) U.S. Cl.
CPC .............. *C04B 28/08* (2013.01); *C04B 24/26* (2013.01); *C04B 24/08* (2013.01); *C04B 14/14* (2013.01); *C04B 24/42* (2013.01); *C04B 2103/0052* (2013.01); *C04B 2111/23* (2013.01)
USPC .......................................................... 524/5

(58) Field of Classification Search
USPC ......................................................... 524/50, 5
See application file for complete search history.

(56) References Cited

U.S. PATENT DOCUMENTS

| | | | |
|---|---|---|---|
| 4,061,825 A | 12/1977 | Counsell et al. | |
| 4,368,077 A | 1/1983 | Ceska et al. | |
| 4,668,541 A | 5/1987 | Fagerlund | |
| 4,670,315 A | 6/1987 | Hillemeir et al. | |
| 4,894,405 A | 1/1990 | Barron | |
| 7,803,853 B2 | 9/2010 | Kothe et al. | |
| 2002/0157576 A1 | 10/2002 | Mills et al. | |
| 2003/0203995 A1 | 10/2003 | Wilson, Sr. | |
| 2004/0019141 A1* | 1/2004 | Bastelberger et al. | 524/261 |
| 2005/0014881 A1* | 1/2005 | Weitzel et al. | 524/442 |
| 2007/0037925 A1 | 2/2007 | Weitzel et al. | |
| 2007/0112117 A1 | 5/2007 | Weitzel | |
| 2007/0155862 A1* | 7/2007 | Haerzschel et al. | 524/5 |
| 2008/0019773 A1 | 1/2008 | Stadtbaumer et al. | |
| 2008/0081853 A1* | 4/2008 | Bacher et al. | 524/8 |
| 2008/0171812 A1 | 7/2008 | Zhang et al. | |
| 2008/0269390 A1 | 10/2008 | Weitzel | |
| 2008/0271848 A1 | 11/2008 | Killat et al. | |

FOREIGN PATENT DOCUMENTS

| | | |
|---|---|---|
| CN | 1055531 | 10/1991 |
| CN | 1497025 | 5/2004 |
| CN | 1906138 | 1/2007 |
| CN | 100999612 | 7/2007 |
| DE | 30 48 818 | 9/1981 |
| DE | 34 45 396 | 6/1986 |
| EP | 1614670 | 1/2006 |
| EP | 2085367 A2 | 8/2009 |
| GB | 2 066 827 | 7/1981 |
| GB | 2 288 393 | 10/1995 |
| JP | 55-121869 | 9/1980 |
| JP | 59-030746 A2 | 2/1984 |
| JP | 03-039387 | 2/1991 |
| JP | 03-290348 | 12/1991 |
| JP | 09-086993 | 3/1997 |
| JP | 09-087061 | 3/1997 |
| JP | 2002160960 | 6/2002 |
| JP | 2003020260 A2 | 1/2003 |
| JP | 2003055019 | 2/2003 |
| JP | 2003089565 A2 | 3/2003 |
| JP | 2005324996 A2 | 11/2005 |
| JP | 2006044958 | 2/2006 |
| JP | 2006225221 | 8/2006 |
| JP | 2006327868 | 12/2006 |
| JP | 2007-1802 A | 1/2007 |
| JP | 2007001802 | 1/2007 |
| JP | 2008-230869 A2 | 10/2008 |
| KR | 10-2004-0016276 | 2/2004 |

(Continued)

OTHER PUBLICATIONS

Derwent Abstract for JP 59-030746, Feb. 1984.*
Wittmann-Regis, Agnes, International Preliminary Report on Patentability for International Application No. PCT/EP2009/067163 dated Jul. 7, 2011.
Denki Kagaku Kogyo K. K., "Polymer-cement mixtures for mortar and concrete," Chemical Abstracts, Chemical Abstracts Service (C A S), US, vol. 116, No. 18, May 4, 1992, XP000286271 ISSN: 0009-2258.
Denki Kagaku Kogyo K. K., "Chemical-resistant binders," Chemical Abstracts, vol. 101, No. 4, Jul. 23, 1984, p. 241, XP000184662 ISSN: 0009-2258.
Denki Kagaku Kogyo K. K. "Polymer-cement mixtures for mortar and concrete," Chemical Abstracts, vol. 116, No. 18, May 4, 1992.
Denki Kagaku Kogyo K. K. "Chemical-resistant binders," Chemical Abstracts, vol. 101, No. 4, Jul. 23, 1984.

(Continued)

*Primary Examiner* — Angela C Scott
(74) *Attorney, Agent, or Firm* — RatnerPrestia

(57) ABSTRACT

The invention relates to acid-resistant, hydraulically setting masses based on a) slag sand, b) one or more pozzolanas, c) one or more fillers, d) one or more polymers based on ethylenically unsaturated monomers, and water.

5 Claims, No Drawings

(56) References Cited

FOREIGN PATENT DOCUMENTS

| KR | 20040089995 | 10/2004 |
|---|---|---|
| WO | WO 86/04889 | 8/1986 |
| WO | WO 01/28955 | 4/2001 |
| WO | 2004092094 | 10/2004 |
| WO | WO 2004/092094 | 10/2004 |
| WO | WO 2005/070849 | 8/2005 |
| WO | 2007048707 A1 | 5/2007 |
| WO | 2007048714 A1 | 5/2007 |

OTHER PUBLICATIONS

Fox, T. G., "Influence of Diluent and of Copolymer Composition on the Glass Temperature of a Polymer System," Bull. Am. Physics Soc., 1, 3, p. 123 (1956).

Houben-Weyl, "Methods of the organic chemistry," vol. E20, Georg Thieme Published, Stuttgart (1987), with English Abstract.

Noll, W., "Chemistry and Technology Silicones," 2nd Edition 1968, Weinheim.

Polymer Handbook 2nd Edition, J. Wiley & Sons, New York (1975).

International Search Report for PCT/EP/2009/067163 filed Dec. 15, 2009, mailed May 21, 2010.

Coppola, L. et al., "Four-Year Behavior of Polymer-Cement Coatings for Concrete Protection," American Concrete Institute, SP (2000), SP 192-73 pp. 1209-1220.

International Search Report for PCT/EP2009/067359 filed Dec. 17, 2009, mailed Jun. 7, 2010.

Office Action dated Dec. 9, 2011 for U.S. Appl. No. 13/141,276.

Final Office Action dated Jul. 11, 2012 for U.S. Appl. No. 13/141,276.

Office Action dated Oct. 16, 2012 for U.S. Appl. No. 13/141,276.

Final Office Action dated Jan. 31, 2013 for U.S. Appl. No. 13/141,276.

Office Action dated Jul. 18, 2013 for U.S. Appl. No. 13/141,276.

Final Office Action dated Nov. 13, 2013 for U.S. Appl. No. 13/141,276.

Response to Office Action of Dec. 9, 2011 for U.S. Appl. No. 13/141,276 (dated Mar. 9, 2012).

Response to Final Office Action of Jul. 11, 2012 for U.S. Appl. No. 13/141,276 (dated Oct. 11, 2012).

Response to Office Action of Oct. 16, 2012 for U.S. Appl. No. 13/141,276 (dated Jan. 15, 2013).

Response to Office Action of Jan. 31, 2013 for U.S. Appl. No. 13/141,276 (dated May 31, 2013).

Response to Office Action of Jul. 18, 2013 for U.S. Appl. No. 13/141,276 (dated Oct. 17, 2013).

Response to Final Office Action of Nov. 13, 2013 for U.S. Appl. No. 13/141,276 (dated Dec. 16, 2013).

Adedeji, A. A. Estimation of service life of coated brickwork mortar joint. Cement and Concrete Research 32 (2002) 199-203.

Novak, Robert Slagstar A binder of the highest quality without calcining process. Feb. 17, 2004.

"Inorganic cementitious materials" by Zhongzheng Yang, Zehngzhou University Press, Nov. 2008, pp. 1, 28, 29, 128, 129, 150-153, 160, 161.

English language abstract of "Inorganic cementitious materials" by Zhongzheng Yang, Zehngzhou University Press, Nov. 2008, provided by Chinese associate reporting office action in corresponding Chinese patent application.

D1—EN 197-1:2000, English version from Jun. 2000—equivalent to DIN EN 197-1, European Standard Cement.

D2—Lea's Chemistry of Cement and Concrete, Fourth Edition, 1998, p. 33.

D4—Machine English language translation of JP 2005-324996 A2.

D4a—Manual English translation of Tables 1, 2, and 3 of JP 2005-324996 A2.

D5—Machine English language translation of JP 2003-020260 A2.

D5a—Manual English translation of Tables 1-8 of JP 2003-020260 A2.

D6—Machine English language translation of JP 2003-089565 A2.

D6a—Manual English translation of Tables 1-8 of JP 2003-089565 A2.

\* cited by examiner

ACID-RESISTANT, HYDRAULICALLY SETTING MASSES

CROSS REFERENCE TO RELATED APPLICATIONS

This application is the national phase filing of international patent application No. PCT/EP2009/067163, filed 15 Dec. 2009, and claims priority of German patent application number 10 2008 055 064.7, filed 22 Dec. 2008, the entireties of which applications are incorporated herein by reference.

FIELD OF THE INVENTION

The invention relates to acid-resistant, hydraulically setting compositions, a process for producing them and also their use.

BACKGROUND OF THE INVENTION

Although metal corrosion in wastewater plants has been looked at for a long time, the importance of corrosion on concrete or mortars has attracted attention only in recent years. Corrosion damage, in particular corrosion damage caused by microbial metabolism of sulfur compounds, are among the more frequently occurring types of damage in wastewater conduits; in addition, there is damage to pumping stations and in wastewater purification plants (treatment plants). The corrosive destruction of concrete or mortar surfaces due to biologically generated (biogenic) sulfuric acid is also observed in biogas plants. The sulfuric acid is formed as metabolite by bacteria of the *Thiobacillus* type living in the aerobic region of wastewater plants or biogas plants. Cement-based materials and lime-containing aggregates are attacked (dissolving and swelling attack) by the sulfuric acid. The effects are considerable: the corrosion rate is, depending on conditions, reported as 6-10 mm/year. The result is a typical washed concrete surface of the damaged concrete (exposure of the rock particles).

It is known from the prior art that the acid resistance of concrete can be improved by combining cements with pozzolanic additives: JP 2002160960 A2 describes a hydraulically setting composition comprising high-alumina cement with pozzolanic additives such as fly ash. Compositions comprising cement and a fine pozzolanic powder are described in JP 2003055019 A2. JP 2006327868 A2 describes compositions comprising high-alumina cement, slag sand and a shrinkage-reducing additive. JP 2006-225221 A2 relates to mortar compositions comprising calcium aluminate cement, pozzolanas and iron-free slag sand, optionally mixed with polymer dispersions or fibers. JP 2006/044958 A2 describes an acid-resistant mortar comprising high-alumina cement, slag sand, polymer dispersion and shrinkage-reducing additive. A mortar composition comprising portland cement, slag sand, a further inorganic binder, acrylate or styrene-butadiene polymer is known from KR 20040089995 A. EP 1614670 A2 relates to cement-based mortar systems based on portland cement clinker, calcium aluminate cement and additives from the group of pozzolanas and latent hydraulic materials. A similar composition comprising portland cement, pozzolana, latent hydraulic binder such as slag sand, with polymer dispersion, water-soluble polymer or expanded clay being able to be added, is described by JP 2007001802 A2.

Although these systems display rapid setting behavior due to the presence of cement, the acid resistance is not satisfactory.

SUMMARY OF THE INVENTION

It is therefore an object of the invention to provide formulations for acid-resistant, hydraulically setting compositions which have a high acid resistance and also have excellent mechanical strength.

It has been found that the object can be achieved by a binder combination of slag sand and polymer to which pozzolanas and optionally small proportions of conventional cements can be added.

DETAILED DESCRIPTION OF THE INVENTION

The invention provides acid-resistant, hydraulically setting compositions based on
a) slag sand,
b) one or more pozzolanas,
c) one or more fillers,
d) one or more polymers based on ethylenically unsaturated monomers,
and also water.

Slag sand is obtained by granulation of blast furnace slag. Slag sand generally comprises from 30 to 45% by weight of CaO, from 30 to 45% by weight of $SiO_2$, from 5 to 15% by weight of $Al_2O_3$, from 4 to 17% by weight of MgO, from 0.5 to 1% by weight of S and traces of other elements. The composition varies as a function of the starting materials used in the blast furnace. Suitable slag sands are commercially available, for example under the trade name Slagstar® from Baumit or Merit 5000 from SSAB Merox. In general, the acid-resistant, hydraulically setting compositions contain from 10 to 50% by weight of the component a), preferably from 15 to 30% by weight, particularly preferably from 20 to 25% by weight, in each case based on the total dry weight of the compositions.

Pozzolanas b) are silica-containing or silica- and alumina-containing, natural or synthetic materials. A distinction is made between natural and synthetic pozzolanas. Natural pozzolanas include glass-rich ashes and rocks of volcanic origin, for example pumice, trass (finely milled tuff), Santorin earth, kieselguhr, cherts (silica rocks), siliceous rock and Moler earth. Synthetic pozzolanas are fired, milled clay (ground brick), fly ashes such as hard coal power station ash, silica dust, oil shale ash (oil shale=bituminous, lime-containing shale) and calcined kaolin (metakaolin). Preference is given to the synthetic pozzolanas, particularly preferably fly ash or silica dust. The amount used is from 0.1 to 50% by weight, preferably from 0.5 to 30% by weight, particularly preferably from 0.5 to 20% by weight, in each case based on the total dry weight of the compositions.

Examples of suitable fillers c) are silica sand, quartz flour, calcium carbonate, dolomite, aluminum silicates, clay, chalk, slaked lime, talc or mica, or else lightweight fillers such as pumice, foamed glass, gas concrete, perlite, vermiculite, carbon nanotubes (CNT). It is also possible to use any mixtures of the fillers mentioned. Preference is given to silica sand and quartz flour. In general, the acid-resistant, hydraulically setting compositions contain from 30 to 90% by weight, preferably from 40 to 80% by weight, fillers, in each case based on the total dry weight of the compositions.

Suitable polymers d) are homopolymers and copolymers of one or more monomers from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes and vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having from 9 to 13 carbon atoms, for example VeoVa9® or VeoVa10® (trade names of Resolution). Particular preference is given to vinyl acetate. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate. Examples of olefins and dienes are ethylene, propylene and 1,3-butadiene. Suitable vinylaromatics are styrene and vinyltoluene. A suitable vinyl halide is vinyl chloride.

Preference is given to copolymers of vinyl acetate with ethylene, copolymers of vinyl acetate with ethylene and one or more further vinyl esters, copolymers of vinyl acetate with ethylene and (meth)acrylic esters, copolymers of vinyl acetate with ethylene and vinyl chloride, vinyl chloride-ethylene copolymers, (meth)acrylic ester polymers, styrene-acrylic ester copolymers, styrene-1,3-butadiene copolymers.

Particular preference is given to copolymers of vinyl acetate with from 1 to 40% by weight of ethylene;

copolymers of from 30 to 90% by weight of vinyl acetate with from 1 to 40% by weight of ethylene and from 5 to 50% by weight of one or more further comonomers from the group consisting of vinyl esters having from 1 to 15 carbon atoms in the carboxylic acid radical, e.g. vinyl propionate, vinyl dodecanoate, vinyl esters of alpha-branched carboxylic acids having from 9 to 13 carbon atoms, e.g. VeoVa9®, VeoVa10®, VeoVa11®;

copolymers of from 30 to 90% by weight of vinyl acetate, from 1 to 40% by weight of ethylene and preferably from 5 to 60% by weight of (meth)acrylic esters of unbranched or branched alcohols having from 1 to 15 carbon atoms, in particular methyl acrylate, n-butyl acrylate or 2-ethylhexyl acrylate;

copolymers of from 30 to 75% by weight of vinyl acetate, from 1 to 30% by weight of vinyl laurate or vinyl esters of an alpha-branched carboxylic acid having from 9 to 13 carbon atoms and also from 5 to 30% by weight of (meth)acrylic esters of unbranched or branched alcohols having from 1 to 15 carbon atoms, in particular methyl methacrylate, n-butyl acrylate or 2-ethylhexyl acrylate, and additionally from 5 to 40% by weight of ethylene;

copolymers comprising vinyl acetate, from 10 to 40% by weight of ethylene and from 1 to 60% by weight of vinyl chloride;

where the figures in percent by weight in each case add up to 100% by weight.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate and optionally ethylene; styrene-acrylic ester copolymers with one or more monomers from the group consisting of methyl acrylate, ethyl acrylate, propyl acrylate, n-butyl acrylate, 2-ethylhexyl acrylate; vinyl acetate-acrylic ester copolymers with one or more monomers from the group consisting of methyl acrylate, ethyl acrylate, propyl acrylate, n-butyl acrylate, 2-ethylhexyl acrylate and optionally ethylene; styrene-1,3-butadiene copolymers; and vinyl chloride-ethylene copolymers with from 5 to 30% by weight of ethylene; where the figures in percent by weight in each case add up to 100% by weight.

The polymers can optionally additionally contain from 0.1 to 5% by weight, based on the total weight of the polymer, of auxiliary monomer units. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carboxylic nitriles, preferably acrylamide and acrylonitrile; monoesters and diesters of fumaric acid and maleic acid, e.g. the diethyl and diisopropyl esters, and also maleic anhydride; ethylenically unsaturated sulfonic acids or salts thereof, preferably vinylsulfonic acid, 2-acrylamido-2-methylpropane-sulfonic acid. Epoxide-functional comonomers such as glycidyl methacrylate and glycidyl acrylate are also suitable. Further examples are silicon-functional comonomers such as acryloxypropyltri(alkoxy)silanes and methacryloxypropyltri(alkoxy)silanes, vinyltrialkoxy-silanes and vinylmethyldialkoxysilanes, with, for example, ethoxy and ethoxypropylene glycol ether radicals being able to be present as alkoxy groups.

The selection of monomers and the selection of the proportions by weight of the comonomers is carried out so that a glass transition temperature Tg of from $-50°$ C. to $+50°$ C. generally results. The glass transition temperature Tg of the polymers can be determined in a known manner by means of differential scanning calorimetry (DSC). The Tg can also be calculated approximately beforehand by means of the Fox equation. According to Fox T. G., Bull. Am. Physics Soc. 1, 3, page 123 (1956): $1/Tg=x_1/Tg_1+x_2/Tg_2+\ldots+x_n/Tg_n$, where $x_n$ is the mass fraction (% by weight/100) of the monomer n and $Tg_n$ is the glass transition temperature in kelvin of the homopolymer of the monomer n. Tg values for homopolymers are given in Polymer Handbook 2nd Edition, J. Wiley & Sons, New York (1975).

Hydrophobically modified polymers are also preferred. Suitable hydrophobicizing agents which can be used in a mixture with the polymers mentioned are organosilicon compounds and/or fatty acid (derivatives).

Suitable organosilicon compounds are silicic esters $Si(OR')_4$, silanes such as tetraorganosilanes $SiR_4$ and organoorganoxysilanes $SiR_n(OR')_{4-n}$ where $n=1$ to 3, polysilanes preferably having the general formula $R_3Si(SiR_2)_nSiR_3$ where $n=0$ to 500, organosilanols $SiR_n(OH)_{4-n}$, disiloxanes, oligosiloxanes and polysiloxanes made up of units of the general formula $R_cH_dSi(OR')_e(OH)_fO_{(4-c-d-e-f)/2}$ where $c=0$ to 3, $d=0$ to 1, $e=0$ to 3, $f=0$ to 3 and the sum $c+d+e+f$ is, depending on the unit, not more than 3.5, where in each case the radicals R are identical or different and are branched or unbranched alkyl radicals having from 1 to 22 carbon atoms, cycloalkyl radicals having from 3 to 10 carbon atoms, alkylene radicals having from 2 to 4 carbon atoms or aryl, aralkyl, alkylaryl radicals having from 6 to 18 carbon atoms and the radicals R' are identical or different alkyl radicals and alkoxyalkylene radicals each having from 1 to 4 carbon atoms, preferably methyl and ethyl, where the radicals R and R' can also be substituted by halogens such as Cl, by ether, thioether, ester, amide, nitrile, hydroxyl, amine, carboxyl, sulfonic acid, carboxylic anhydride and carbonyl groups and in the case of the polysilanes R can also be OR'.

Preference is given to organoorganoxysilanes $SiR_n(OR^1)_{4-n}$ where $n=1$ to 3, in particular isooctyltriethoxysilane, n-octyltriethoxysilane, hexadecyltriethoxy-silane.

The organosilicon compounds mentioned can be prepared by methods as described in Noll, Chemie and Technologie der Silicone, 2nd Edition 1968, Weinheim, and in Houben-Weyl, Methoden der organischen Chemie, Volume E20, Georg Thieme Verlag, Stuttgart (1987).

Further compounds which are suitable for hydrophobicization are fatty acids and fatty acid derivatives which liberate fatty acid or the corresponding fatty acid anion under alkaline conditions, preferably pH>8. Preference is given to fatty acid compounds from the group consisting of fatty acids having from 8 to 22 carbon atoms, the anhydrides thereof, the metal soaps thereof, the amides thereof and also the esters thereof with monohydric alcohols having from 1 to 14 carbon atoms, with glycol, with polyglycol, with polyalkylene glycol, with glycerol, with monoethanolamine, diethanolamine or triethanol-amine, with monosaccharides.

Suitable fatty acids are branched and unbranched, saturated and unsaturated fatty acids having from 8 to 22 carbon atoms in each case. Examples are lauric acid (n-dodecanoic acid), myristic acid (n-tetradecanoic acid), palmitic acid (n-hexadecanoic acid), stearic acid (n-octadecanoic acid) and oleic acid (9-dodecenoic acid). An example of a fatty acid anhydride is lauric anhydride.

Suitable metal soaps are those of the above-mentioned fatty acids with metals of main groups 1 to 3 and transition group 2 of the PTE, and also with ammonium compounds $NX_4^+$, where the radicals X are identical or different and are each H, a $C_1$-$C_8$-alkyl radical or a $C_1$-$C_8$-hydroxyalkyl radical. Preference is given to metal soaps with lithium, sodium, potassium, magnesium, calcium, aluminum, zinc, and the ammonium compounds.

Suitable fatty acid amides are the fatty acid amides obtainable from monoethanolamine or diethanolamine and the abovementioned $C_8$-$C_{22}$-fatty acids.

Suitable fatty acid esters are the $C_1$-$C_{14}$-alkyl esters and -alkylaryl esters of the abovementioned $C_8$-$C_{22}$-fatty acids, preferably methyl, ethyl, propyl, butyl, ethylhexyl esters and also the benzyl esters.

Suitable fatty acid esters also include the monoglycol, diglycol and polyglycol esters of the $C_8$-$C_{22}$-fatty acids.

Further suitable fatty acid esters are the monoesters and diesters of polyglycols and/or polyalkylene glycols having up to 20 oxyalkylene units, e.g. polyethylene glycol and polypropylene glycol.

The monoesters, diesters and triesters of glycerol with the abovementioned $C_8$-$C_{22}$-fatty acids and also the monoesters, diesters and triesters of monoethanolamine, diethanolamine and triethanolamine with the abovementioned $C_8$-$C_{22}$-fatty acids are also suitable.

The fatty acid esters of sorbitol and mannitol are also suitable.

The hydrophobicizing agents for modifying the polymers d) are generally used in an amount of from 1 to 20% by weight, based on the polymer d).

Particular preference is also given to combinations of polymers which have not been hydrophobically modified with hydrophobically modified polymers. The weight ratio is generally from 1:10 to 10:1.

The polymers d) can be used in the form of their aqueous dispersions or as water-redispersible polymer powder. Preference is given to using them as water-redispersible polymer powder. The polymers in the form of their aqueous dispersions or water-redispersible polymer powders are produced in aqueous medium and preferably by the emulsion polymerization process. The polymers are in this case obtained in the form of aqueous dispersions and can optionally be converted by conventional drying processes into corresponding water-redispersible powders (dispersion powders). To obtain the hydrophobically modified polymers, the hydrophobicizing agents are preferably added after the polymerization of the polymer dispersion is complete and the dispersion is optionally dried. Processes for producing polymer dispersions and dispersion powders are known to those skilled in the art and are described, for example, in WO 2004/092094 A1, the relevant information in which is incorporated by reference into the present patent application.

The proportion of polymers d) in acid-resistant, hydraulically setting compositions is generally from 0.5 to 30% by weight, preferably from 0.5 to 10% by weight, in each case based on the total dry weight of the compositions. When the polymer is used in the form of an aqueous dispersion, the proportion is based on the dry weight of the polymer.

The composition can optionally additionally contain a small proportion of conventional cements. For example, standard cement in accordance with DIN EN 197-1, e.g. portland cement CEM I-CEM V, blast furnace slake cement CEM III, can be present. The proportion is preferably from 0 to <20% by weight, particularly preferably from 0 to 10% by weight, in each case based on the total dry weight of the compositions. Most preferably, no conventional cement is present in addition to the slag sand a).

To produce ready-to-process compositions, the constituents a) to d) are mixed with water. The amount of water necessary for this purpose is generally from to 40% by weight, preferably from 10 to 20% by weight, in each case based on the total dry weight of the acid-resistant, hydraulically setting compositions.

The production is not tied to any specific procedure or mixing apparatus and can, for example, be carried out in a concrete mixer or a ready-mixed concrete mixing apparatus. The acid-resistant, hydraulic compositions can be delivered to the building site in fully mixed form as dry mortar composition. As an alternative, mixtures can be produced from the constituents only on the building site and be converted into hydraulically setting compositions by addition of water.

The mortars obtained therewith are suitable for coating building works, in particular in cable construction, for producing acid-resistant surfaces. The mortar is also suitable as jointing mortar, for example for jointing brickwork in wastewater conduits. A further field of use is as repair mortar, in particular for surfaces exposed to acid. The mortar is also suitable as adhesive, for example for adhesively bonding tiles and plates in the wastewater sector.

The following examples serve to illustrate the invention:

Base Formulation:

| | | |
|---|---|---|
| 225 | parts by weight of slag sand | (Slagstar 42.4N) |
| 100 | parts by weight of fly ash | (EFA filler) |
| 15 | parts by weight of silica dust | (Elkem Micro-Silica 940 U-H) |
| 246 | parts by weight of silica sand | (AKW HR 0.7-1.2T, No. 5) |
| 366 | parts by weight of silica sand | (AKW HR 0.3-0.8T, No. 7) |
| 2.5 | parts by weight of antifoam | (Agitan P 800) |
| X | parts by weight of polymer | |

The polymers indicated below were added in the form of water-redispersible polymer powders to the base formulation in the amounts indicated.

The base formulation (BF) was stirred with from 120 parts by weight to 170 parts by weight of water so as to give a mortar having a slump (without tamping) in accordance with DIN 18555/EN 1015 of 10 cm.

Comparative Formulation:

The comparative formulation (CF) was produced in a manner analogous to the base formulation except that the slag sand was replaced by the same amount of portland cement CEM 152,5T.

Use Test:

Prisms having dimensions of 4 cm×4 cm×8 cm were produced from each of the mortar compositions and were stored under standard conditions (23° C., 50% relative atmospheric humidity) for 14 days.

The test for resistance to sulfuric acid was carried out according to the Hamburg cable construction guideline (Franke et al., Prüfrichtlinie für Mörtel im Sielbau, Tiefbau-Ingenieurbau, Straßenbau (TIS), 4/97).

5 test specimens (prisms) were used per batch.

The test specimens were in each case stored in water for 14 days (water storage, reference) and then stored at pH=0 for 14 days (acid storage).

The pH was monitored daily and if necessary kept constant by means of after-titration. The aqueous phase was not changed during testing. After the storage times had elapsed, all loose constituents were removed from the test specimens and the specimens were washed with water.

The weight of the prisms after water storage (mw) and after acid storage (ma) was determined. The greater the weight decrease Lm between water storage and acid storage, the more material was removed by corrosion. A positive $\Delta m$ indicates that the test specimen is undamaged. The weight increase is attributable to the after-hydration of the undamaged test specimen.

The following polymers were tested:

Polymer P1:

Vinyl acetate-ethylene copolymer having Tg=−7° C. (Vinnapas 5044N)

Polymer P2:

Vinyl chloride-ethylene copolymer (Vinnapas V 8062)

Polymer P3:

Mixture of 47 parts by weight of polymer P1 and 3 parts by weight of a vinyl chloride-ethylene copolymer which had been hydrophobically modified by means of silane (Vinnapas A 7172)

Polymer P4:

Styrene-acrylate copolymer having Tg=+20° C. (Vinnapas 2012N)

The test results in the table show that corrosion is effectively prevented (positive $\Delta m$) when using the compositions according to the invention, while in the case of the comparative compositions (without powder=comparative example 1, without powder and without slag sand=comparative example 2) the weight of the test specimen decreases as a result of concrete corrosion.

TABLE

| Example | Formulation | Polymer | Amount in % by weight | mw [g] | ma [g] | $\Delta m$ [g] |
|---|---|---|---|---|---|---|
| CEx. 1 | BF (1) | — | — | 246.5 | 244.8 | −1.7 |
| CEx. 2 | CF (2) | — | — | 261.8 | 128.1 | −133.7 |
| Ex. 1 | BF (3a) | P1 | 1 | 240.1 | 266.5 | +26.4 |
| Ex. 2 | BF (3b) | P1 | 5 | 238.6 | 258.5 | +19.9 |
| Ex. 3 | BF (7b) | P2 | 5 | 232.5 | 252.8 | +20.3 |
| Ex. 4 | BF (I) | P3 | 5 | 248.0 | 258.2 | +10.2 |
| Ex. 5 | BF (5a) | P4 | 5 | 242.1 | 255.0 | +12.9 |

The invention claimed is:

1. An acid-resistant, hydraulically setting composition consisting of
   a) 20 to 25% b.w. of slag sand,
   b) 0.5 to 30% b.w. of one or more pozzolanas,
   c) 40 to 80% b.w. of one or more fillers,
   d) 0.5 to 10% b.w. of one or more polymers of one or more ethylenically unsaturated monomers,
   in each case based on the total dry weight of the composition, and
   e) water.

2. The composition as claimed in claim 1, wherein one or more polymers from the group consisting of copolymers of vinyl acetate with ethylene, copolymers of vinyl acetate with ethylene and one or more further vinyl esters, copolymers of vinyl acetate with ethylene and (meth)acrylic esters, copolymers of vinyl acetate with ethylene and vinyl chloride, vinyl chloride-ethylene copolymers, (meth)acrylic ester polymers, styrene-acrylic ester copolymers and styrene-1,3-butadiene copolymers are present as polymers d).

3. The composition as claimed in claim 1, wherein the polymers d) are present in the form of aqueous dispersions thereof or as water-redispersible polymer powder.

4. An acid-resistant, hydraulically setting composition consisting of a) 20 to 25% b.w. of slag sand, b) 0.5 to 30% b.w. of one or more pozzolanas, c) 40 to 80% b.w. of one or more fillers, d) 0.5 to 10% b.w. of one or more polymers of one or more ethylenically unsaturated monomers, e) less than 20% by weight of standard cement, in each case based on the total dry weight of the composition, and water.

5. A building works coating, a jointing mortar, a repair mortar or an adhesive comprising the composition as claimed in claim 1.

* * * * *